United States Patent [19]

Benfer et al.

[11] Patent Number: 4,866,827
[45] Date of Patent: Sep. 19, 1989

[54] SEALING ARRANGEMENT FOR ROLL BEARINGS IN SKIN PASS MILL STANDS

[75] Inventors: Ernst-Oskar Benfer, Bad Laasphe; Rolf G. Irle, Hilchenbach, both of Fed. Rep. of Germany

[73] Assignee: SMS Schloemann-Siemag Aktiengesellschaft

[21] Appl. No.: 211,779

[22] Filed: Jun. 27, 1988

[30] Foreign Application Priority Data

Jun. 27, 1987 [DE] Fed. Rep. of Germany ....... 3721265

[51] Int. Cl.$^4$ ...................... B21D 53/10; F16K 41/14
[52] U.S. Cl. .......................... 29/148.4 S; 29/148.4 A; 384/147; 277/84; 277/152; 277/153; 277/164
[58] Field of Search ..................... 29/148.4 A, 148.4 S, 29/149.5 R, 123, 724, 149.5 NM; 384/147; 277/84, 152, 153, 164

[56] References Cited

U.S. PATENT DOCUMENTS

| | | | |
|---|---|---|---|
| 4,165,881 | 8/1979 | Salter | 277/152 |
| 4,389,053 | 6/1983 | Innis, Jr. et al. | 277/152 X |
| 4,455,856 | 6/1984 | Salter, Jr. et al. | 277/152 |
| 4,586,720 | 5/1986 | Simmons et al. | 277/152 |

FOREIGN PATENT DOCUMENTS 2731313 12/1983 Fed. Rep. of Germany.

Primary Examiner—Timothy V. Eley
Assistant Examiner—Peter Dungba Vo
Attorney, Agent, or Firm—Toren, McGeady & Associates

[57] ABSTRACT

A sealing arrangement for roll bearings in skin pass mill stands in which the roll neck has a tapered portion extending between the end face of the roll and a portion of the roll neck which is provided with a neck sleeve and is supported in a bearing bushing in the bearing housing. An annular, flexible sealing member constructed in one piece and reinforced by means of an annular wire rope or strip is slid onto the tapered portion of the roll neck and rests on the tapered portion with annular sealing projections. An outer annular end of at least one of two axially spaced radially extending, elastic annular ribs can be placed in elastic frictional contact with at least one annular sealing surface which is rigidly connected to the lid of a housing and is arranged laterally of an annular flange rigidly connected to the housing. The second annular rib on the side of the roll is a rib stump whose circumference has the shape of a truncated cone. The rib stump has a sharp tear-off edge facing the annular flange.

5 Claims, 1 Drawing Sheet

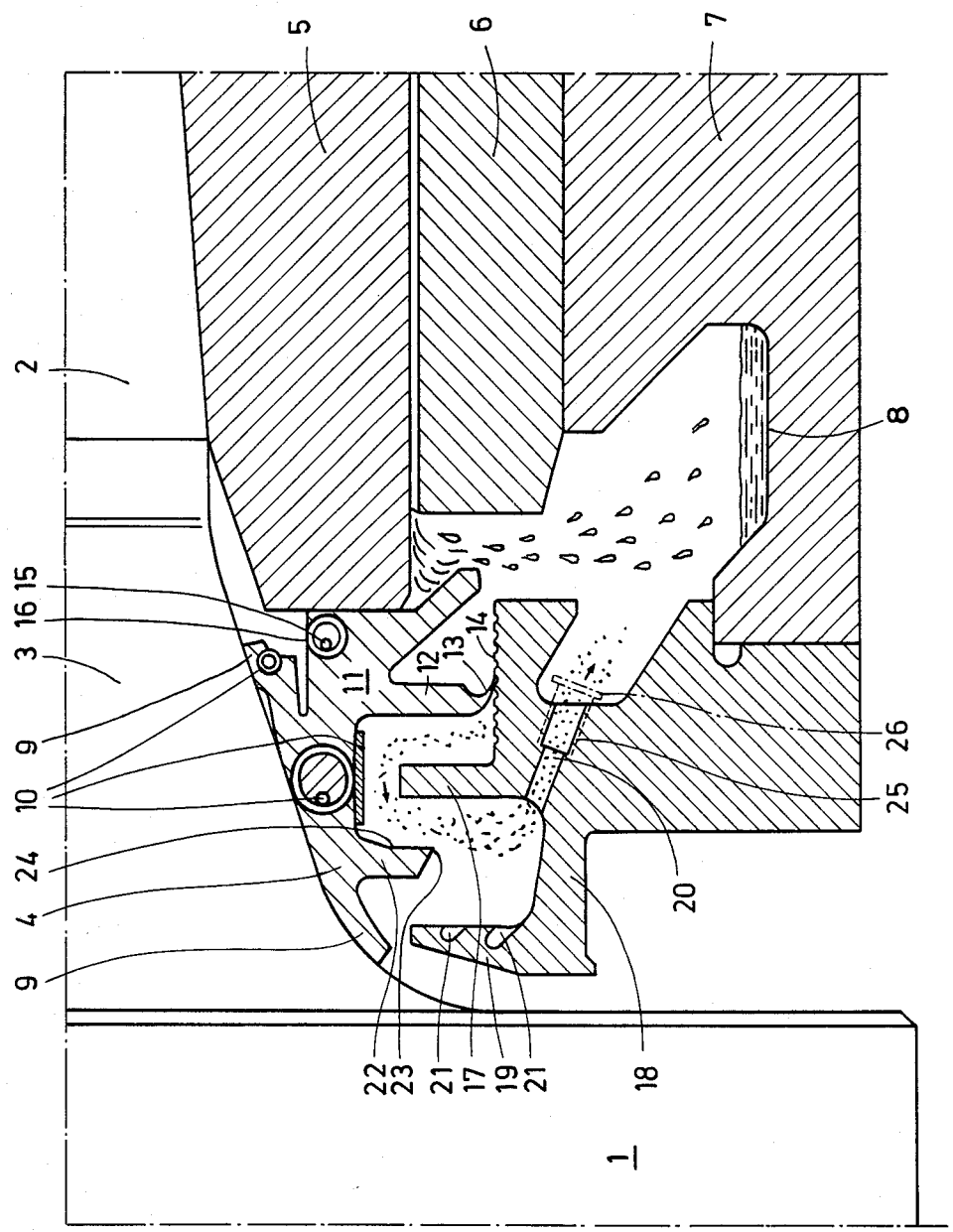

SEALING ARRANGEMENT FOR ROLL BEARINGS IN SKIN PASS MILL STANDS

BACKGROUND OF THE INVENTION

1. Field of the Invention

The present invention relates to a sealing arrangement for roll bearings in skin pass mill stands in which the roll neck has a tapered portion extending between the end face of the roll and the portion of the roll neck which is provided with a neck sleeve and is supported in a bearing bushing in the bearing housing. The arrangement includes an annular, flexible sealing member constructed in one piece and reinforced by means of a wire rope ring and possibly a steel strip. The sealing member is slid onto the tapered portion of the roll neck and rests on the tapered portion with annular sealing projections. An outer annular end of at least one of two axially spaced radially extending, elastic annular ribs can be placed into elastic frictional contact with at least one annular sealing surface which is rigidly connected to a lid of the housing and, thus, to the housing and is arranged laterally of an annular flange rigidly connected to the housing.

2. Description of the Prior Art

German patent No. 27 31 313 discloses a sealing arrangement for skin pass mill stands in which the annular rib on the side of the roll extends approximately to an annular projection of a stationary annular body. An oil discharge bore is arranged in the same radial plane as the annular rib.

The long annular rib which rotates during operation of the mill has the result that the oil particles which passed the annular rib and the annular lip connected to the annular rib on the side of the bearing housing cannot come to rest and cannot flow through the oil discharge bore into an oil sump duct, rather, these particles are continuously whirled up. Even those particles which are already in the oil discharge bore are whirled out of the oil discharge bore by the annular rib rotating directly above the opening of the bore.

Moreover, in the known sealing arrangement, the danger exists that oil particles which are forced outwardly along the wall of the annular rib as a result of the centrifugal force can continue to travel at the end of the annular rib along the surface thereof and, thus, may leave the region of the oil discharge bore. These oil particles can then easily reach the roll surface where they negatively influence the quality of the rolled material.

Very high oil temperatures may occur during operation. When the oil is boiling, oil vapors rise from the oil sump and reach the roll through the oil discharge bore.

It is, therefore, the primary object of the present invention to provide a sealing arrangement for skin pass mill stands in which no oil can travel from the bearing region of the roll to the surface of the roll.

SUMMARY OF THE INVENTION

In accordance with the present invention, the second annular rib on the side of the roll is a rib stump whose circumference has the shape of a truncated cone and the rib stump has a sharp tear-off edge facing the annular flange.

The construction of the sealing member according to the present invention provides the advantage that oil particles which have passed the annular rib on the side of the bearing are prevented from being whirled up in the labyrinth-type region of the seal. The tear-off edge of the rib stump has the effect that the oil particles which have deposited on the rib stump and which travel due to centrifugal force to the tear-off edge, cannot continue to travel on the outer circumference of the rib stump against the centrifugal force. When a plurality of oil particles have deposited on the tear-off edge to form an oil drop, the oil drop will, when its mass has become large enough, be flung due to the centrifugal force against the annular projection of the stationary housing lid. Contrary to oil particles which are suspended in air, these flowable, heavier drops cannot reach the roll surface.

In order to prevent whirling up of the oil particles as much as possible, the rib stump should have such a size that its tip extends into a labyrinth-type region defined between the annular flange, the annular projection and an additional annular flange connected to the annular projection.

In accordance with an advantageous feature of the invention, the additional annular flange has at least one circumferential collecting groove which extends inclined in cross-section relative to the roll axis. Any stray oil particles are collected in this collecting groove before they can leave the labyrinth-type region. The oil particles form oil droplets in the collecting groove from where they flow toward the annular projection.

In accordance with another important feature of the present invention, the annular projection extending between the annular flange and the additional annular flange has a surface which is conically inclined relative to the roll axis. At least one oil discharge bore is provided at the lowest point of the annular projection.

The latter feature ensures that the oil droplets are collected at the lowermost point of the annular projection and can again be fed to the lubricating oil cycle through the oil discharge bore.

In accordance with another significant feature of the present invention, the oil discharge bores have threads into which threaded plugs can be screwed. The threaded plugs ensure that, when the oil is boiling, the oil particles cannot rise through the oil discharge bores.

In accordance with another important feature of the present invention, the sealing member has a sealing member portion to which the annular rib on the side of the bearing is connected integrally in one piece. This sealing member portion is reinforced by a wire rope ring, so that the annular rib and the annular lip attached to the annular rib cannot be deformed as a result of the centrifugal force. As a result of this feature, it is ensured that the annular lip provides an optimum sealing action and, thus, only very few oil particles can reach the labyrinth-type region from where they can be safely returned to the lubricant cycle.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWING

In the drawing:

The Figure of the drawing is a schematic sectional view of the sealing arrangement according to the present invention.

DETAILED DESCRIPTION OF THE INVENTION

As illustrated in the drawing, a roll 1 has a roll neck 2 with a tapered portion 3. Sealing member 4 is slid onto the tapered portion 3. A neck sleeve 5 is heated on roll neck 2. Neck sleeve 5 is mounted in a bearing bushing 6 of the bearing housing 7. Oil is continuously supplied to the gap between the neck sleeve 5 and the bearing bushing 6. The oil emerging from the gap is collected in an annular projection 8 of the bearing housing 7 and is returned to be reprocessed.

The sealing member 4 rests with annular sealing projections 9 against the tapered portion 3 of roll neck 2. Reenforcing elements 10 stiffen the sealing member 4. The sealing member has a sealing member portion 11 to which an annular rib 12 with an annular lip 13 is integrally connected. Annular lip 13 runs on a sealing surface 14. To ensure that annular lip 13 rests always with the same pressure against the sealing surface 14, a wire spring 15 with a helical spring 16 surrounding the ring 15 is provided in sealing member portion 11. These elements prevent a deformation of the sealing member portion 11 and, thus, of annular rib 12 and of annular lip 13. As a result, an optimum sealing action in the region of the annular lip 13 and sealing surface 14 is always ensured.

The sealing surface 14 ends toward roll 1 at an annular flange 17. An annular projection 18 and an additional annular flange 19 are connected to annular flange 17. The annular projection 18 is constructed so as to conically taper away from roll 1. At the lowest point of annular flange 17, an oil discharge bore 20 is provided which leads to an oil sump in annular projection 18. The oil discharge bore 20 is provided with a thread into which a threaded plug 26 can be screwed.

The additional annular flange 19 has two circumferentially extending collecting grooves 21. In cross-section, the collecting groove 21 has the shape of blind-end bores. The grooves 21 are inclined downwardly toward the axis of the roll, so that oil which has collected in the collecting groove can flow unimpeded to the lowest point of the annular projection 18.

The sealing member 4 is provided on the side of the roll with an annular rib stump 22 which extends parallel to any other rib 12. The rib stump 22 has the shape of a truncated cone. On the side of the annular flange, the rib stump 22 has a tear-off edge 23 from which oil collecting on the side surface 24 of the rib stump 22 is discharged toward annular projection 18. The rib stump 22 is dimensioned in such a way that it conducts oil particles coming from annular lip 13 into the space between annular flange 17 and additional annular flange 19, but does not boil up the oil particles suspended within this space.

While a specific embodiment of the invention been shown and described in detail to illustrate the application of the inventive principles, it will be understood that the invention may be embodied otherwise without departing from such principles.

We claim:

1. A sealing arrangement for a roll bearing of a roll in a skin pass mill stand, the roll having an axis and a side, wherein the roll has a roll neck with a tapered portion extending between an end face of the roll and a portion of the roll neck which is provided with a neck sleeve and is supported in a bearing bushing in a bearing housing, comprising an annular, flexible sealing member constructed in one piece and reinforced by means of an annular wire rope and a steel strip, the sealing member being slid onto the tapered portion of the roll neck and resting on the tapered portion with annular sealing projections, the sealing member having a radially extending, elastic annular rib, an outer annular end of the annular rib being placed in elastic frictional contact with at least one annular sealing surface which is rigidly connected to a lid of the housing and is arranged laterally of an annular flange rigidly connected to the housing, the sealing member having a radially extending, elastic annular rib stump axially spaced from the annular rib and arranged on the side of the roll, wherein the annular flange, an annular projection connected to the annular flange, and an additional annular flange connected to the annular projection form a labyrinth-type region, the annular rib stump extending into the labyrinth-type region, the circumference of the annular rib stump having the shape of a truncated cone, and the rib stump having a sharp tear-off edge facing the annular flange.

2. The sealing arrangement according to claim 1, wherein the annular rib stump has a tip, the annular rib stump being of such a size that the tip extends partially into the labyrinth-type region.

3. The sealing arrangement according to claim 2, wherein the additional annular flange has at least one circumferential collecting groove which extends inclined relative to the roll axis.

4. The sealing arrangement according to claim 2, wherein the annular projection extending between the annular flange and the additional annular flange has a surface which is conically inclined relative to the roll axis, so that the annular projection has a lowest point, at least one oil discharge bore being provided at the lowest point.

5. The sealing arrangement according to claim 4, wherein the at least one oil discharge bore is provided with a thread, so that a threaded plug can be screwed into the oil discharge bore.

* * * * *